(12) United States Patent
Min

(10) Patent No.: US 7,073,772 B2
(45) Date of Patent: Jul. 11, 2006

(54) MOTOR BRAKE STRUCTURE AND MANUFACTURING METHOD THEREOF

(76) Inventor: Woo Kee Min, 104-306 Hyundac APT. Apqujeong-dong, Kangnam-gu, Seoul (KR)

( * ) Notice: Subject to any disclaimer, the term of this patent is extended or adjusted under 35 U.S.C. 154(b) by 59 days.

(21) Appl. No.: 10/699,866

(22) Filed: Nov. 4, 2003

(65) Prior Publication Data

US 2005/0092950 A1 May 5, 2005

(51) Int. Cl.
*F16K 31/02* (2006.01)

(52) U.S. Cl. .................. 251/129.13; 188/184

(58) Field of Classification Search ........... 251/129.13; 310/77, 93; 188/184, 185, 180, 181 R, 181 A
See application file for complete search history.

(56) References Cited

U.S. PATENT DOCUMENTS

| | | | | |
|---|---|---|---|---|
| 2,829,754 A | * | 4/1958 | Norcross | 400/338.1 |
| 3,080,020 A | * | 3/1963 | Hershey | 188/184 |
| 3,627,085 A | * | 12/1971 | Habuka et al. | 188/184 |
| 3,645,363 A | * | 2/1972 | Fuths | 188/184 |
| 4,355,540 A | * | 10/1982 | Chombard et al. | 74/5.1 |
| 4,616,737 A | * | 10/1986 | Orii | 188/184 |

* cited by examiner

*Primary Examiner*—Justine R. Yu
*Assistant Examiner*—Peter deVore
(74) *Attorney, Agent, or Firm*—Richard C. Litman

(57) ABSTRACT

Disclosed is a motor brake structure including: a rotor; a rotor axis relatively fixed to the rotor; a soft material brake having a central portion thereof into which the rotor axis is inserted, the soft material brake rotating identically with the rotor axis; and a case formed at an outer side of the brake, wherein the soft material brake has a base part having a mortise into which the rotor axis is inserted; a flexible part circularly extended from an end of the base part; and a friction part extended from an end of the flexible part, having a friction surface formed at an outer circumference thereof, and large-sized relative to at least the flexible part.

14 Claims, 5 Drawing Sheets

MOTOR BRAKE STRUCTURE AND MANUFACTURING METHOD THEREOF

BACKGROUND OF THE INVENTION

1. Field of the Invention

The present invention relates to a motor brake, and more particularly, to an actuator used for opening and closing a valve or the like and a motor brake structure in which a rotation speed of a motor is adjusted. In particular, the present invention is directed to a motor brake structure that can be used when a Hysteresis synchronous motor is reversely rotated.

2. Description of the Related Art

Generally, in order to automatically adjust a pipeline, a valve for opening and closing the pipeline, a motor for enabling the valve to be automatically opened and closed, and an actuator being driven by the motor are used.

Specifically, when the valve is closed, a power supply is applied to energize the actuator such that the valve is closed using a rotation force of the motor. Further, when the motor is rotated in a valve close direction, a restoration force is applied to a resilient spring embedded in the actuator such that a predetermined energy is stored in the resilient spring. Additionally, when the closed valve is opened, the restoration force of the resilient spring embedded in the actuator enables the valve to be moved in its original position, that is, in a valve open direction.

On the other hand, in a course of a procedure in which the restoration force of the resilient spring enables the valve to be returned to the original position (open position), the motor is reversely rotated. Further, the rotation speed of the reversely-rotated motor is gradually sped-up by the restoration force continuously applied by the resilient spring, such that a significant fast rotation speed is resultantly accomplished.

As described above, the conventional motor brake structure has a drawback in that, if the motor is reversely rotated at a high speed, noise is generated from a connection part (for example, a gear) of a deceleration unit connected to a motor axis.

Additionally, the conventional motor brake structure has a drawback in that since a gear abrasion in the deceleration unit is excessive, its life becomes short.

Further, the conventional motor brake structure has a drawback in that in case an eccentric error of the motor axis is generated, the noise is generated from the motor itself.

Furthermore, the conventional motor brake structure has a disadvantage in that when the motor is reversely rotated at a high speed, an electromagnetic circuit of the motor is overworked.

SUMMARY OF THE INVENTION

Accordingly, the present invention is directed to a motor brake structure and a manufacturing method thereof that substantially obviate one or more problems due to limitations and disadvantages of the related art.

An object of the present invention is to provide a motor brake structure in which a rotation speed of a motor can be limited to a predetermined speedy level below when the motor is reversely rotated.

Another object of the present invention is to provide a motor brake for reducing noise generated at the time of automatic adjustment of a valve.

A further another object of the present invention is to provide a motor brake structure in which an electromagnetic circuit can be prevented from being damaged.

A still another object of the present invention is to provide a motor brake structure in which a motor brake is provided using a soft material so that noise can be remarkably reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a motor brake structure including: a rotor; a rotor axis relatively fixed to the rotor; a soft material brake having a central portion thereof into which the rotor axis is inserted, the soft material brake rotating identically with the rotor axis; and a case formed at an outer side of the brake, wherein the soft material brake has a base part having a mortise into which the rotor axis is inserted; a flexible part circularly extended from an end of the base part; and a friction part extended from an end of the flexible part, having a friction surface formed at an outer circumference thereof, and large-sized relative to at least the flexible part.

In another aspect of the present invention, there is provided a pipeline opening and closing device including: a motor unit for generating a rotation force by a power supply applied from an external; a deceleration unit for decelerating a rotation speed of the motor unit; an actuator for allowing a pipe to be opened and closed by the rotation force transmitted from the deceleration unit; and a braking unit having a brake for decelerating a reverse rotation speed of the motor unit by a friction force generated by deflecting toward and contacting a friction part formed at an outer side with a case by an eccentric force when the motor unit is reversely rotated.

In a further another aspect of the present invention, there is provided a motor brake structure including: a rotor; a rotor axis fixed to the rotor; a soft material brake having a central portion thereof into which the rotor axis is fitted, the soft material brake rotating identically with the rotor axis, and having a base part into which the rotor axis is fitted, at least two flexible parts extended from the base part, and a friction part formed at an end of the flexible part; and a case formed at an outer side of a brake, for contacting with the friction part to decrease a rotation speed of the rotor when the rotor is reversely rotated.

In a still another aspect of the present invention, there is provided a manufacturing method of a motor brake, the method including the steps of: inserting a rotor axis into a rotor; and inserting and fixing an end of the rotor axis passing through the rotor, into and to a soft brake.

The present invention has an effect in that the motor brake is provided with a high performance.

The present invention has an advantage in that if the motor brake is constructed integrally using the same material, the motor brake can be formed simply by one time injection process, and since its structure is simple, it can be manufactured at a low cost.

The present invention can embody a function of the motor brake more easily and cheaply. Specifically, the present invention has an effect in that the soft material is used to reduce the noise when the motor brake functions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
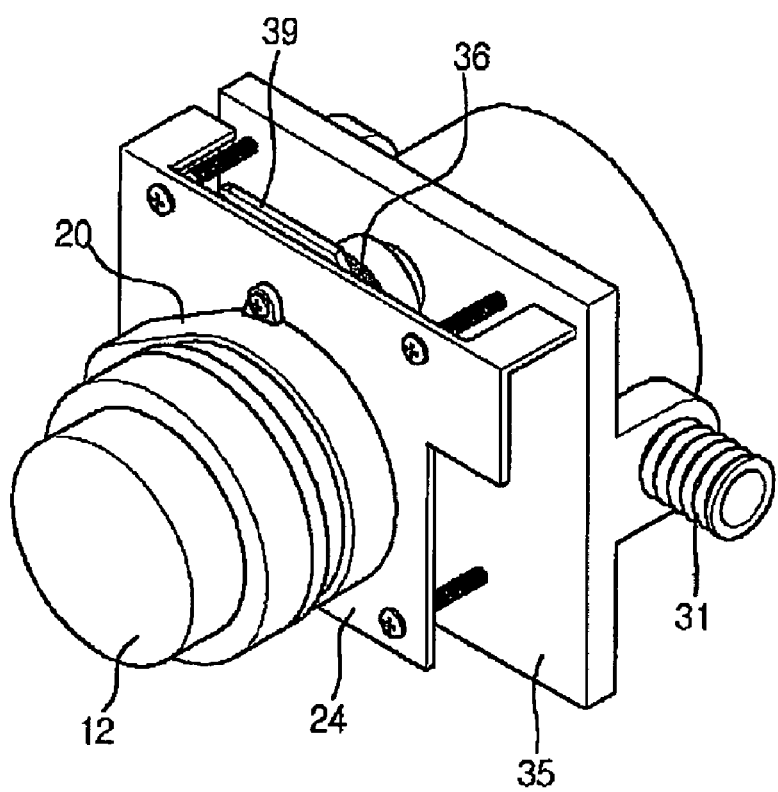
FIG. 1 is a perspective view illustrating a pipeline opening and closing device having a motor brake applied thereto according to a preferred embodiment of the present invention.

FIG. 1 is a perspective view illustrating a pipeline opening and closing device having a motor brake applied thereto according to a preferred embodiment of the present invention.

Referring to FIG. 1, the pipeline opening and closing device includes a case 12 having at least motor embedded therein; a deceleration unit 20 for reducing a rotation speed of the motor for transmission; a first support plate 24 having the case 12, etc. fixed thereto; a second support plate 35 formed facing with the first support plate 24; and a resilient spring 36 and an operating plate 39 formed in a space section between the first support plate 24 and the second support plate 35.

Further, an actuator is additionally embedded in the rear of the second support plate 35, and the actuator can adjust an open and close state of the pipe 31.

Figure 2:
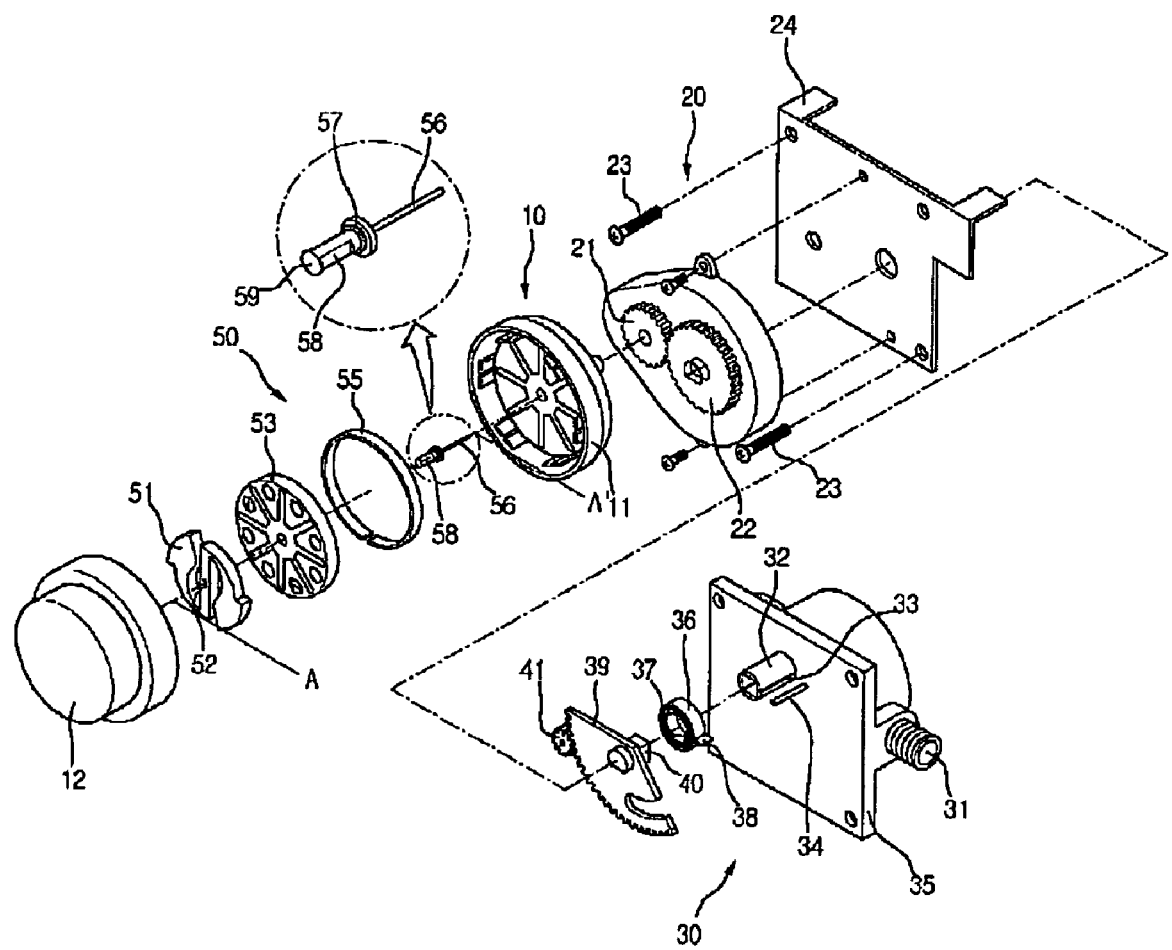
FIG. 2 is a disassembled perspective view illustrating a pipeline opening and closing device according to a preferred embodiment of the present invention.

FIG. 2 is a disassembled perspective view illustrating a pipeline opening and closing device according to a preferred embodiment of the present invention.

Referring to FIG. 2, the pipeline opening and closing device according to the present invention are mainly classified to include a motor unit 10 for generating a driving force using a power supply applied from an external; a deceleration unit 20 for decelerating the rotation force generated by the motor unit 10; the actuator 30 for allowing the open and close state of the pipe 31 to be adjusted by the rotation force decelerated using the deceleration unit 20; and a braking unit 50 for maintaining a reverse-rotation speed at a predetermined speedy level below when the motor is reversely rotated.

An operation of the pipeline opening and closing device according to the present invention constructed above will be briefly described.

First, the motor unit 10 generates the rotation force by the power supply applied from the external. Additionally, the rotation force generated from the motor unit 10 is decelerated through the deceleration unit 20. The deceleration unit 20 can increase the rotation force and instead, reduce the rotation speed, and therefore the pipeline can be more precisely opened and closed.

The rotation force decelerated by the deceleration unit 20 is transmitted to the actuator 30 such that the open and close state of the pipe 31 can be adjusted.

Specifically, the braking unit 50 performs a function of maintaining the reverse-rotation of the motor generated when the valve is opened, at the predetermined speedy level below.

In detail, the motor unit 10 uses a hysteresis synchronous motor, and has a stator 11, a rotor 53 and a rotor axis 56 formed, and further includes the case 12 formed to cover an entire of the motor unit 10.

The driving force transmitted from the rotor axis 56 is transmitted to the deceleration unit 20. The deceleration unit 20 includes a plurality of deceleration gears 21 and 22. With reference to the drawings, the driving force from the rotor axis 56 is transmitted to a first deceleration gear 21, and then transmitted to a second deceleration gear 22. However, the gear constructing the deceleration unit 20 has no limit in its number, and it does not matter even though more than two gears are applied. Further, it does not matter even though any type of deceleration apparatus is applied. Furthermore, in case appropriate speed adjustment can be made, the deceleration unit 20 cannot be also required.

The deceleration unit 20 can be fixed to the first support plate 24 by a plurality of screws 23, etc.

After the deceleration unit 20 decelerates the driving force, the decelerated driving force is transmitted to the actuator 30.

The actuator 30 includes an operation axis 40 connected with a terminal gear of the deceleration unit 20; an operation plate 39 formed integrally with the operation axis 40; a subsidiary gear 41 tooth-combined with teeth formed at an outer circumference portion of the operation plate 39; a valve 32 being operated by rotation of the operating axis 40; a resilient spring 36 interposed between the operating axis 40 and the valve 32; and a fixing groove 33 and a fixing key 34 formed at one side of the rotated valve 32 so as to support a position of a gap portion with the resilient spring.

It does not matter even though the valve 32 has any structure as a concrete type for allowing the valve to move up and down by a rotation angle such that it can be exemplified as a screw apparatus, and various structures can be used according to a concrete state. That is, if the valve 32 is rotated, a male screw formed at the outer circumference of the valve 32 and a female screw formed within the actuator 30 are mutually operated with each other such that the valve 32 can also move up and down.

The valve 32 and the operation axis 39 are shaped in a non-circular type such that they can rotate by the same degree, to thereby rotate by the same rotation angle without sliding. A rectangular type provided in the drawings is just only an example.

The fixing key 34 is shaped to protrude toward an upper side surface of the second support plate 35, but is just only for manufacture and installation convenience, and it is enough such that the gap portion with the resilient spring 36 is only fixed. In order to securely fix the positions of the both gap portions with the resilient spring 36, an operating end 37 and a fixing end 38 are formed. The resilient spring 36 uses a plate spring.

The braking unit 50 includes a brake 51 formed using a soft material plastic as a material; a rotor 53 for generating the rotation force by a force facing with the stator 11; a hysteresis ring 55 inserted into an inner side surface of the rotor 53; and the rotor axis 56 fitted into the rotor 53.

Since the brake 51 includes a plurality of bent-up portions, in case of a high speedy rotation, its shape is deformed and expanded. Additionally, at a central portion of the brake 51 is formed a mortise 52 for inserting the rotor axis 56 therethrough.

At a central portion of the rotor 53 is formed a shaft insertion hole 54 for inserting the rotor axis 56 therethrough.

The hysteresis ring 55 can be strongly attached to the inner side surface of the rotor 53 by a metal adhesive. However, in case the motor being in use is any other motor than the hysteresis synchronous motor, the hysteresis ring 55 itself cannot be also required.

The brake 51 is simultaneously integrally constructed using a single soft material, and the single soft material can use a soft rubber and silicon.

The rotor axis 56 includes a brake latching end 59 having a diameter expanded such that the brake 51 is taken out from the rotor axis 56 after once fitted into; a brake fixing surface 58 having an outer circumference depressed such that the brake 51 is not mutually slid with the rotor axis 56 fitted into the mortise 52; and a rotor latching end 57 protruded such that the rotor 53 is securely inserted not to be taken out from the rotor axis 56.

Hereinafter, an operation of the pipeline opening and closing device as mentioned above will be described.

First, describing a valve closing process, the rotor 53 is rotated by the power supply applied from the external. The rotation force of the rotor 53 is transmitted to the deceleration unit 20 to decelerate the rotation speed. The rotation force is transmitted from a terminal end of the deceleration unit 20 to the operation axis 40, and the operation axis 40 resultantly allows the valve 32 to rotate. On the other hand, if the valve 32 rotates, the resilient spring 36 is also rotated together, but since both gap portions of the valve 32 with the resilient spring 36 are fixed to the fixing groove 33 and the fixing key 34, the resilient spring 36 is extracted or expanded to generate a predetermined restoration force.

If the valve 32 is rotated, the pipe 31 is closed.

Additionally, describing a valve opening process, if the power supply applied to the motor is switched off, the restoration force caused by an elastic energy stored in the resilient spring 36 allows the valve 23, the operation axis 40, the rotor 53, and the motor unit 10, etc. to be reversely rotated. That is, the rotor 53 is rotated oppositely to the rotation direction at the time of opening the valve 32.

On the other hand, since the energy stored in the resilient spring 36 is continuously emitted to the external, the rotation speed of the rotor 53 is continuously increased. Additionally, as the rotation speed of the rotor 53 gradually increases, the soft material brake 51, specifically, a friction part (Referring to reference numeral 513 of FIG. 5) is deflected and expanded toward an outer side by a centrifugal force. Therefore, if the rotation speed of the rotor 53 increases over a predetermined speedy level, an outer circumference surface of the brake 51 and an inner circumference surface of the case 12 are in contact with each other, and a friction force is generated between the outer circumference surface of the brake 51 and the inner circumference surface of the case 12.

The above-mentioned friction force is resisted against the rotation force of the rotor 53 such that the rotation speed of the rotor 53 can be prevented from being indefinitely increased by the restoration force of the resilient spring 36. Specifically, in case the rotation speed and a rotation acceleration degree are at a high level, since the centrifugal force of the brake 51 is also similarly increased, the rotation speed of the motor can be more promptly allowed to be at a lower level.

Further, a plurality of variation elements such as the rotation acceleration degree applied from the resilient spring 36, the rotation speed of the brake 51, and a friction coefficient between the outer circumference surface of the brake 51 and the inner circumference surface of the case 12, etc. can appropriately adjust the rotation speed of the rotor 53.

Furthermore, since a deformation degree of the brake 51 can be adjusted depending on the rotation speed of the rotor 53, even a shape, a material, a strength, etc. of the brake 51 can allow the reverse rotation speed of the rotor 53 at the time of opening the valve 32 to be adjusted.

On the other hand, in case it is general that the pipe 31 is opened for most of time, when the valve is closed as mentioned above, the motor and the rotor can be operated in a forward rotation direction, and when the valve is opened, the brake 51 can adjust the reverse rotation speed of the rotor. However, in case of a general pipeline in which the pipe 31 is closed for most of time, unlike the above descriptions, when the valve is opened, the motor and the rotor are operated in the forward rotation direction, and when the valve is closed, the brake 51 can also adjust the reverse rotation speed of the rotor. However, there is no difference in that the brake 51 adjusts the reverse rotation speed of the motor unit 10.

Figure 3A:
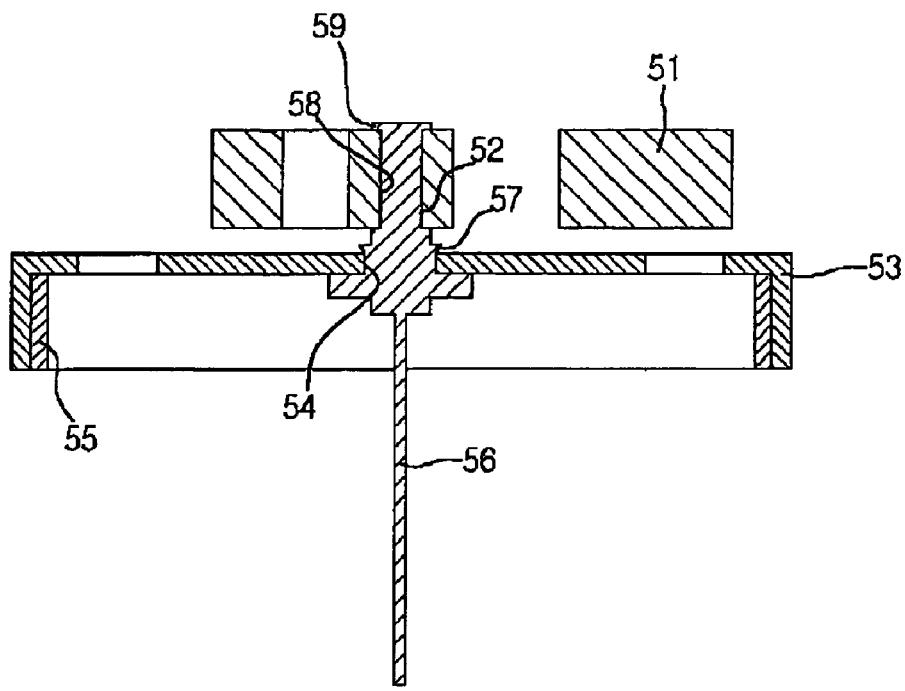
FIGS. 3A and 3B are sectional views along line A–A' of FIG. 2.
Figure 3B:
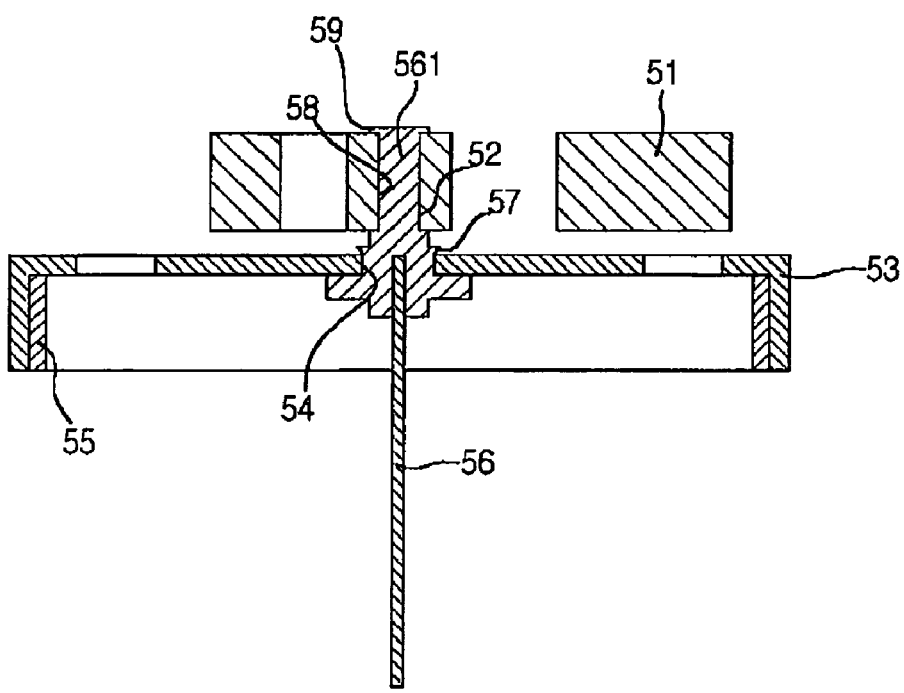

FIGS. 3A and 3B are sectional views along line A–A' of FIG. 2.

Referring to FIG. 3A, the motor brake structure according to the present invention includes the rotor 53; the rotor axis 56 inserted into the rotor 53; and the brake 51 additionally inserted into the rotor axis 56.

In detail, the brake 51 has the non-circular mortise 52 formed at an appropriate center portion thereof, and the mortise 52 is provided with the brake fixing surface 58 in an insertion fashion. The mortise 52 and the brake fixing surface 58 are shaped in the non-circular type in which both is allowed to identically correspond to each other, in detail, in a circular type having flatly-cut surfaces at both side surfaces thereof such that the rotor axis 56 and the brake 51 are not slid with each other.

Further, the rotor 53 has the shaft insertion hole 54 formed at the center portion thereof, and the rotor axis 56 is provided with the rotor latching end 57 for allowing a fitting position of the rotor axis 56 to be fixed after the rotor axis 56 is fitted into the shaft insertion hole 54. Therefore, after the rotor latching end 57 is forcibly fitted down to up, the rotor latching end 57 presses the rotor 53 such that the rotor 53 and the rotor axis 56 can be mutually securely fixed to each other. On the other hand, in order to reliably prevent the rotor 53 and the rotor axis 56 from being slid with each other, the metal adhesive can be also additionally applied to a contact surface between the rotor 53 and the rotor axis 56.

On the other hand, in a combination manner between the rotor 53 and the rotor axis 56, as described above particularly, the rotor latching end 57 previously formed can be fitted into through and combined with the appropriate central portion of the rotor 53, but other combination manners can be also employed. For example, after the rotor axis 56 is fitted into through the central portion of the rotor 53, a portion of the rotor axis 56 can be deformed through a caulking work. In detail, after the rotor axis 56 is fitted, the rotor 53 and the rotor axis 56 can be combined by using the rotor latching end 57 formed in the caulking work.

Figure 4:
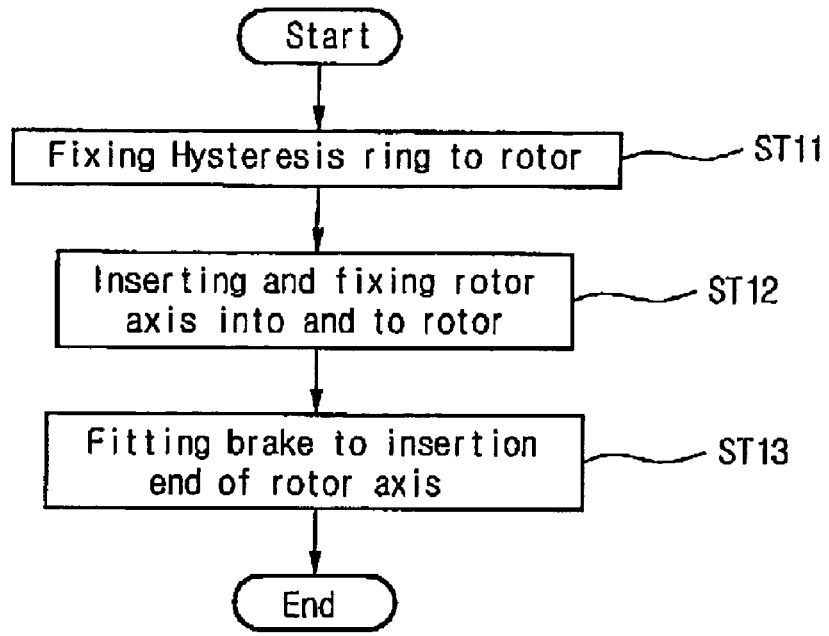
FIG. 4 is a flow chart for describing a manufacturing method of a motor brake according to a preferred embodiment of the present invention.

FIG. 4 is a flow chart for describing a manufacturing method of a motor brake according to a preferred embodiment of the present invention.

A manufacturing procedure of the above-mentioned motor brake will be described with reference to FIG. 4.

First, the hysteresis ring is fixed to the rotor 53 (ST 11). Additionally, the rotor axis 56 is inserted into the rotor 53 (ST 12). At this time, the rotor axis 56 is fitted into and fixed to the central portion of the rotor 53. The rotor axis 56 can be forcibly fitted into the rotor 53, but after the rotor axis 56 is inserted, a portion of the rotor axis 56 is deformed in the caulking work such that the rotor latching end 57 can be formed while being fixed to the rotor 53.

Additionally, the brake 51 is fitted into and fixed to the end of the fitted rotor axis 56 (ST 13). At this time, the mortise 52 formed at the center portion of the brake 56 is shaped to correspond to the brake fixing surface 58, but its size is allowed to be reduced comparing with the brake fixing surface 58 such that the once inserted soft brake 51 is not slid with the rotor axis 56.

Further, in order to prevent the noise to be generated by contacting the brake 51 with the rotor 53 at the high speedy rotation, the brake 51 and the rotor 53 can be formed at a distance.

On the other hand, this embodiment employs a manner in which the integral-typed rotor axis 56 is inserted into the rotor 53. However, it is possible that as a specific portion for allowing the rotor axis 56 to be inserted into the rotor 53, a rotor bushing 561 is formed separately.

FIG. 3B illustrates that the rotor bushing 561 and the rotor axis 56 are separated into separated parts.

In detail, after the rotor bushing 561 is inserted into a hole of the central portion of the rotor 53, the rotor bushing 561 is fixed in the caulking work, and the rotor axis 56 can be inserted into and fixed to the hole of the inserted rotor bushing 561 as a separate part.

Figure 5:
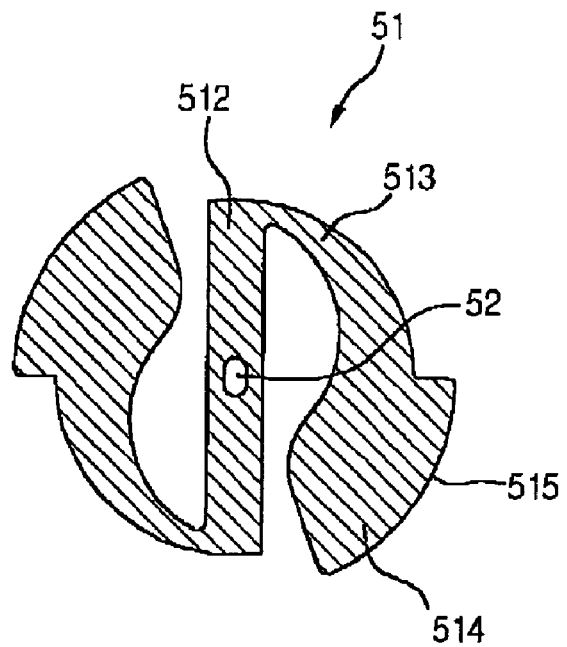
FIG. 5 is a plane view illustrating a brake according to a preferred embodiment of the present invention.

FIG. 5 is a plane view illustrating a brake according to a preferred embodiment of the present invention.

Referring to FIG. 5, the brake 51 of the present invention includes a non-circular shaped base part 512 having the rotor axis 56 inserted thereinto; a circular flexible part 513 extended thinly and smoothly from an end of the base part 512; and a friction part 514 formed at an end of the flexible part 513.

The outer circumference surface of the friction part 514 has a smooth and circular friction surface 515, and is in contact with the inner circumference surface of the case 12 thereby to cause the friction force. Further, in order to allow much centrifugal force to be applied, the outer circumference surface of the friction part 514 is large-sized in comparison with the base part 512 and the flexible part 513. Specifically, the flexible part 513 is thinly formed such that the friction part 514 can be much deflected outside using even small centrifugal force. Additionally, in order to provide a relative much resilient deformation for the flexible part 513, the flexible part 513 is gradually thicker at its outsider portion, and its connection portion with the base part 512 is most thinly formed.

Further, in order for only the friction part 514 to be in contact with the case 12, a connection portion of the flexible part 513 and the friction part 514 is stepped at its outer circumference. By doing so, the friction part 514 is much large-sized relative to the flexible part 513, and an effect in that the centrifugal force is more increased can be also obtained.

Figure 6:
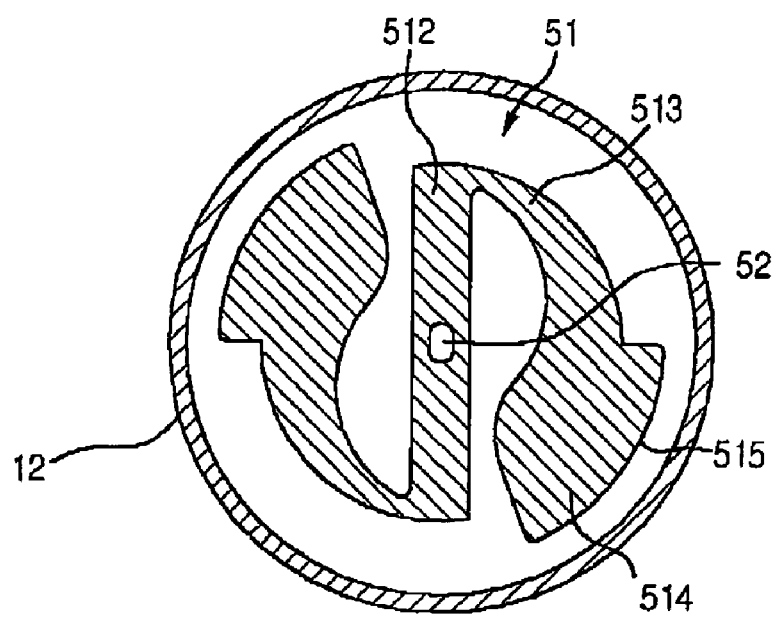
FIGS. 6 and 7 are respective views for describing operation states of motor brake structures according to a preferred embodiment of the present invention, an abrasion force being not generated in FIG. 6 and the abrasion force being generated in FIG. 7.
Figure 7:
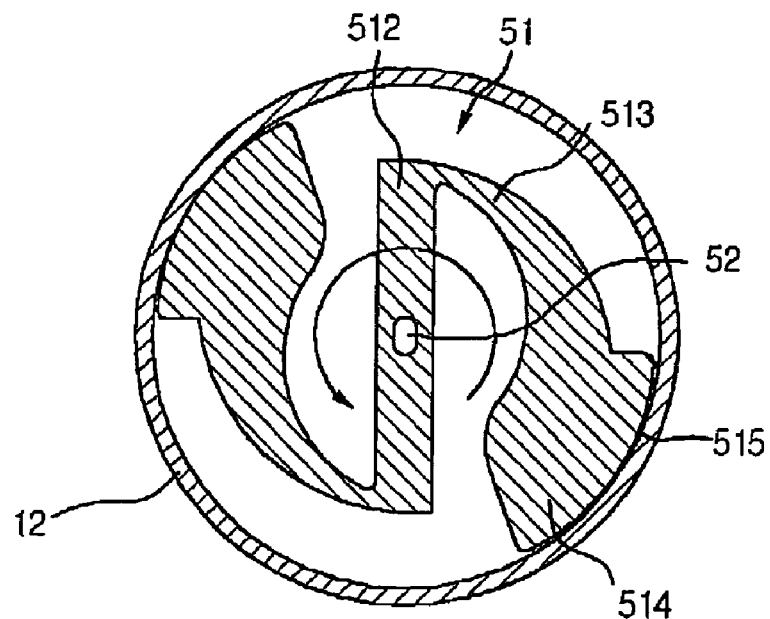

FIGS. 6 and 7 are respective views for describing operation states of motor brake structures according to a preferred embodiment of the present invention, an abrasion force being not generated in FIG. 6 and the abrasion force being generated in FIG. 7.

FIGS. 6 and 7 are views for describing operation states of the motor brake structure according to a preferred embodiment of the present invention.

FIG. 6 illustrates a state in which the rotor 53 is stopped or rotated at the low speedy level such that the friction part 514 is not in contact with the inner circumference surface of the case 12.

To the contrary, FIG. 7 illustrates a state in which the rotor 53 is rotated at the high speedy level such that a friction surface 515 being the outer circumference surface of the friction part 514 is in contact with the inner circumference surface of the case 12. If the rotor 53 is rotated at the high speedy level, thereby providing the friction force over a critical value as described above, the friction force causes the rotation speed of the rotor 53 to be reversely reduced.

However, the reverse rotation direction of the motor and the rotor, that is, a direction of the force applied by the resilient spring 36 is preferably opposite to a direction in which the flexible part 513 is formed. With reference to FIG. 7, an arrow direction can be exemplified as the reverse rotation direction.

The present invention has an effect in that the friction part 514 and the base part 512 are integrally formed of the material such as the rubber, etc. such that the friction part 514 of the motor brake is not in contact with an inner wall of the case 12 when the motor is at a low rotation speed level relative to the centrifugal force, and such that the friction part 514 is in contact with the inner wall of the case 12 when the motor is at a high rotation speed level, to thereby provide the motor brake having a high performance at a low cost.

The motor brake has at least two friction parts formed to face with each other centering on the base part at an edge of the base part, and the friction part and the base part are constructed such that the friction part fluctuates and has the restoration force with respect to the base part. If the integral-typed construction is made of the same material as described above, the motor brake has an advantage in that it can be formed simply by one time injection process, and since its structure is simple, it can be manufactured at a low cost.

The present invention can embody a function of the motor brake more easily and cheaply. Specifically, the present invention has an effect in that the soft material is used to reduce the noise when the motor brake functions.

It will be apparent to those skilled in the art that various modifications and variations can be made in the present invention. Thus, it is intended that the present invention covers the modifications and variations of this invention provided they come within the scope of the appended claims and their equivalents.

I claim:

1. A motor brake structure comprising:

a rotor;

a rotor axis relatively fixed to the rotor;

a soft material brake having a central portion thereof into which the rotor axis is inserted, the soft material brake rotating identically with the rotor axis; and a case formed at an outer side of the brake, wherein the soft material brake has a base part having a mortise into which the rotor axis is inserted; a flexible part circularly extended from an end of the base part; and a friction part extended from an end of the flexible part, having a friction surface formed at an outer circumference thereof, and large-sized relative to at least the flexible part;

wherein the flexible part is gradually more large-sized at an outsider portion thereof, and the flexible part and the friction part are stepped to each other at a connection outer circumference surface facing said case.

2. The motor brake structure of claim 1, wherein the rotor axis is fitted into and fixed to the rotor.

3. The motor brake structure of claim 1, wherein the brake is formed as a single body.

4. The motor brake structure of claim 1, further comprising a brake latching end protruded such that the brake latching end inserted into the mortise is latched with the brake.

5. The motor brake structure of claim 1, further comprising a rotor latching end extended from the rotor axis, for fixing a position at which the rotor axis is fitted into the rotor.

6. The motor brake structure of claim 1, wherein the rotor has an inner circumference surface to which a hysteresis ring is fixed.

7. The motor brake structure of claim 1, wherein the flexible part is formed in an opposite direction to a reverse rotation direction of the motor.

8. The motor brake structure of claim 1, wherein the mortise and a brake fixing surface of the rotor axis corresponding to the mortise have non-circular sections such that they are not slid with each other.

9. The motor brake structure of claim 1, wherein the flexible part has the least thickness at a connection portion of the flexible part and the base part.

10. The motor brake structure of claim 1, wherein the friction surface is rounded.

11. The motor brake structure of claim 1, further comprising a rotor bushing as a separate part for allowing the rotor axis to be fixed to the rotor.

12. A motor brake structure comprising:

a rotor;

a rotor axis fixed to the rotor;

a soft material brake having a central portion thereof into which the rotor axis is fitted, the soft material brake rotating identically with the rotor axis, and having a base part into which the rotor axis is fitted, at least two flexible parts extended from the base part, and a friction part formed at an end of the flexible part; and a case formed at an outer side of a brake, for contacting with the friction part to decrease a rotation speed of the rotor when the rotor is reversely rotated wherein the flexible part and the friction part are stepped to each other at a connection outer circumference surface facing said case.

13. The motor brake structure of claim 12, wherein the friction part has an outer circumference surface rounded.

14. The motor brake structure of claim 12, wherein the brake is formed as a single body of a rubber or silicon material.

* * * * *